(12) United States Patent
Reimnitz et al.

(10) Patent No.: US 12,341,410 B2
(45) Date of Patent: Jun. 24, 2025

(54) ELECTRIC MACHINE ARRANGEMENT

(71) Applicant: Schaeffler Technologies AG & Co. KG, Herzogenaurach (DE)

(72) Inventors: Dirk Reimnitz, Bühl (DE); Ivo Agner, Bühl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/021,467

(22) PCT Filed: Jul. 1, 2021

(86) PCT No.: PCT/DE2021/100561
§ 371 (c)(1),
(2) Date: Feb. 15, 2023

(87) PCT Pub. No.: WO2022/042786
PCT Pub. Date: Mar. 3, 2022

(65) Prior Publication Data
US 2023/0353019 A1    Nov. 2, 2023

(30) Foreign Application Priority Data

Aug. 26, 2020  (DE) .................... 10 2020 122 250.5

(51) Int. Cl.
*H02K 9/193*  (2006.01)
*H02K 1/18*   (2006.01)
*H02K 7/08*   (2006.01)

(52) U.S. Cl.
CPC ............... *H02K 9/193* (2013.01); *H02K 1/18* (2013.01); *H02K 7/085* (2013.01)

(58) Field of Classification Search
CPC ................................. H02K 1/18; H02K 7/085
USPC ...................................... 310/49.22, 266–268
See application file for complete search history.

(56) References Cited

U.S. PATENT DOCUMENTS

| 3,413,503 A | 11/1968 | Parker |
| 2007/0001522 A1 | 1/2007 | Nitzsche |
| 2014/0139069 A1 | 5/2014 | Bradley |

FOREIGN PATENT DOCUMENTS

| DE | 4306588 A1 | 1/1994 | |
| DE | 4424215 A1 | 1/1996 | |
| DE | 10158757 A1 | 6/2003 | |
| DE | 102005063165 A1 | 7/2007 | |
| DE | 102006052763 A1 | 5/2008 | |
| DE | 102008015450 A1 * | 9/2009 | ............. H02K 1/185 |
| DE | 102012013199 A1 | 4/2013 | |
| DE | 102018126064 A1 * | 5/2019 | ............... B60K 6/26 |
| DE | 102017130348 A1 | 6/2019 | |
| DE | 102018209817 A1 | 12/2019 | |
| EP | 1421665 A1 | 5/2004 | |
| EP | 1739810 A2 | 1/2007 | |
| EP | 2227851 A1 | 9/2010 | |
| EP | 2733822 A1 * | 5/2014 | ............. H02K 1/182 |
| EP | 2937973 A1 * | 10/2015 | ............. H02K 1/185 |

(Continued)

*Primary Examiner* — Jose A Gonzalez Quinones
(74) *Attorney, Agent, or Firm* — Suiter Swantz IP

(57) ABSTRACT

An electric machine arrangement includes an electric machine having a stator and a rotor, a component supporting the stator, and an output element that is in contact with the rotor for conjoint rotation therewith. The stator is supported relative to the rotor via at least a first bearing in such a way as to be decoupled from the rotary motion of the rotor.

16 Claims, 7 Drawing Sheets

(56) References Cited

FOREIGN PATENT DOCUMENTS

| | | |
|---|---:|---:|
| FR | 2164876 A1 | 8/1973 |
| JP | 0530689 A | 2/1993 |
| WO | 9201096 A1 | 1/1992 |
| WO | 9946505 A1 | 9/1999 |
| WO | 03026097 A1 | 3/2003 |
| WO | 2008026268 A1 | 3/2008 |
| WO | 2009118077 A1 | 10/2009 |
| WO | 2010092403 A2 | 8/2010 |
| WO | 2012156719 A2 | 11/2012 |
| WO | 2017070034 A1 | 4/2017 |

\* cited by examiner

ELECTRIC MACHINE ARRANGEMENT

CROSS-REFERENCE TO RELATED APPLICATIONS

This application is the U.S. National Phase of PCT Appln. No. PCT/DE2021/100561 filed Jul. 1, 2021, which claims priority to DE 102020122250.5 filed Aug. 26, 2020, the entire disclosures of which are incorporated by reference herein.

TECHNICAL FIELD

The present disclosure relates to an electric machine arrangement, comprising an electric machine for driving an electrically drivable motor vehicle, having a stator and a rotor, and comprising a component supporting the stator (such as a housing) and an output element that is in contact with the rotor (such as an output shaft) for conjoint rotation therewith.

BACKGROUND

For electric motors, it is important to align the parts through which the magnetic field flows very precisely, since even small deviations in the position of the parts among one another can have a significant effect on the magnetic flux (e.g., due to altered air gaps). It is therefore important to make the mechanical structure of the electric motor sufficiently robust to ensure the necessary exact alignment of the electric or magnetic parts. When designing the rotor and the stator, it is therefore important that these components are not deformed to an unacceptable degree either by forces generated by the motor itself or by external loads acting on the motor, or by inertial forces, such as the centrifugal force acting on the rotor. In addition, the bearing of the rotor must be sufficiently stiff to ensure the exact alignment of the rotor and stator.

In the practical design of electric motors for motor vehicles, the need to make the structure of the electric motor particularly stiff often conflicts with the requirements for compact design, low weight, high power density and low costs that always exist in vehicle construction.

SUMMARY

The present disclosure is based on the object of providing an electric machine arrangement with an electric machine that ensures a design that saves as much space as possible and at the same time ensures highly precise positioning of the rotor and stator relative to one another.

The considerations of the disclosure were based on the idea "Instead of designing all load-bearing components to be particularly stiff, robust and large, it usually makes more sense to take additional measures or additional components at suitable points to ensure that the load on the neighboring parts is reduced." It is also usually more sensible to implement short tolerance chains or tolerance-insensitive component arrangements instead of just relying on high-precision production processes. This is where the disclosure comes in.

The object is achieved by an electric machine arrangement having the features described herein. An electric machine arrangement according to the disclosure comprises an electric machine with a stator and with a rotor, a component supporting the stator and an output element which is in contact with the rotor for conjoint rotation therewith. According to the disclosure, the stator is arranged supported relative to the rotor via at least a first bearing in such a way as to be decoupled from the rotary motion of the rotor. This has the advantage that this solution, which at first glance may seem somewhat awkward, considerably reduces the mechanical stresses that act on the electrically active parts of the motor or on the structures surrounding the electrically active parts of the motor. This allows deformation of the parts to be reduced without having to make the parts themselves more robust.

The fact that the stator is mounted on the rotor also makes the electric motor less sensitive to positional deviations, installation tolerances or temporary displacements of the rotor shaft that occur during driving. Since the stator is mounted on the rotor, the position of the stator is directly linked to the current position of the rotor, so that changes in the position of the rotor shaft affect the rotor and stator equally.

Further advantageous embodiments of the disclosure are described herein. The features listed individually in the claims can be combined with one another in a technologically meaningful manner and can define further embodiments of the disclosure. In addition, the features indicated in the claims are specified and explained in more detail in the description, wherein further preferred embodiments of the disclosure are shown.

First, the individual elements of the claimed subject matter of the disclosure are explained in the disclosure, and advantageous embodiments of the subject matter of the disclosure are also described below.

Electric machines are used to convert electrical energy into mechanical energy and/or vice versa, and generally include a stationary part referred to as a stator, stand, or armature, and a part referred to as a rotor or runner, and arranged movably relative to the stationary part.

In the case of electric machines designed as rotation machines, a distinction is made in particular between radial flux machines and axial flux machines. A radial flux machine is characterized in that the magnetic field lines extend in the radial direction in the air gap formed between rotor and stator, while in the case of an axial flux machine the magnetic field lines extend in the axial direction in the air gap formed between rotor and stator.

The housing encloses the electric machine. A housing can also accommodate the control and power electronics. The housing can furthermore be part of a cooling system for the electric machine and can be designed in such a way that cooling fluid can be supplied to the electric machine via the housing and/or the heat can be dissipated to the outside via the housing surfaces. In addition, the housing protects the electric machine and any electronics that may be present from external influences.

The stator of a radial flux machine is usually constructed cylindrically and generally consists of electrical laminations that are electrically insulated from one another and are constructed in layers and packaged to form laminated cores. With this structure, the eddy currents in the stator caused by the stator field are kept low. Distributed over the circumference, grooves or peripherally closed recesses are let into the electrical lamination running parallel to the rotor shaft and accommodate the stator winding or parts of the stator winding. On the basis of the construction towards the surface, the slots can be closed with locking elements such as locking wedges or covers or the like to prevent the stator winding from being detached.

A rotor is the rotating (spinning) part of an electric machine. In particular, a rotor is used when there is also a stator. The rotor generally comprises a rotor shaft and one or more rotor bodies arranged on the rotor shaft for conjoint rotation. The rotor shaft can also be hollow, which on the one hand saves weight and on the other hand allows lubricant or coolant to be supplied to the rotor body. If the rotor shaft is hollow, components, for example shafts, from adjacent units can protrude into the rotor or through the rotor without negatively influencing the functioning of the electric machine.

The gap between the rotor and the stator is called the air gap. In a radial flux machine, this is an axially extending annular gap with a radial width that corresponds to the distance between the rotor body and the stator body. The magnetic flux in an electric axial flux machine, such as an electric drive machine of a motor vehicle designed as an axial flux machine, is directed axially in the air gap between the stator and rotor, parallel to the axis of rotation of the electric machine. The air gap that is formed in an axial flux machine is thus essentially in the form of a ring disk.

The magnetic flux in an electric axial flux machine, such as an electric drive machine of a motor vehicle designed as an axial flux machine, is directed axially in the air gap between the stator and rotor, parallel to the axis of rotation of the electric machine. With axial flux machines, a differentiation is made, among other things with a view to their expansion, between axial flux machines in an I arrangement and axial flux machines in an H arrangement. An axial flux machine in an I-arrangement is understood as meaning an electric machine in which a single rotor disk of the electric machine is arranged between two stator halves of a stator of the electric machine and can be acted upon by a rotating electromagnetic field. An axial flux machine in an H arrangement is understood to be an electric machine in which two rotor disks of a rotor of the electric machine accommodate a stator of the electric machine in the annular space located axially between them, via which the two rotor disks can be subjected to a rotating electromagnetic field.

According to an advantageous embodiment of the disclosure, it can be provided that the component supporting the stator is designed as a housing of the electric machine, which ensures a correspondingly compact design and corresponding protection of the rotor and stator as well as their mutual storage.

According to a further advantageous embodiment of the disclosure, it can also be provided that the rotor is mounted on the supporting component via a second bearing by means of at least one first bearing point. If the stator is supported on the rotor, the task of the rotor bearing is to support the entire electric machine and to ensure the correct position and alignment of the electric machine relative to its surrounding components. The rotor position and the position of the overall system can be stabilized in a simple manner by the rotor being mounted on the supporting component, which is embodied as a housing, for example.

Furthermore, according to a likewise advantageous embodiment of the disclosure, it can be provided that the stator is supported with the interposition of a length compensation element in the direction of rotation and is connected to the component supporting the stator at least in an axially movable manner. The torque support, which is preferably arranged on the radially outer area of the stator by the length compensation element, in combination with the first bearing via which the stator is supported on the rotor and is decoupled from the rotary movement of the rotor, decouples the stator from the rotary movement of the rotor and thus prevents the stator from being twisted to an impermissible extent or also rotating. This torque support supports the reaction torque that always occurs when the engine generates a torque that is transmitted from the rotor shaft to a downstream unit of the drive train. Viewed in the circumferential direction, the stator is more or less permanently connected to the motor housing via the length compensation element, as is necessary for the function of the motor. For all other directions of movement, the torque support is not a significant limitation, so that the stator can always be aligned with the position of the rotor through the bearing point between the stator and rotor and can also follow changes in the rotor's position, such as those that can occur during driving operation due to elastic deformation or thermal expansion of the electric motor housing and/or the electric motor shaft. Advantageously, the length compensation element is designed as an extension that extends in the axial direction or in the radial direction, which is guided in some areas in a corresponding recess, the extension being connected either to the stator or to the component supporting the stator, and the corresponding recess in the supporting component or is formed in the stator. This ensures a structurally simple and effective torque support of the stator via the length compensation element and at the same time enables mobility of the stator and rotor, which allows smaller position changes of the rotor and/or stator—for example due to thermal expansion or the like—to be compensated for or followed.

Furthermore, the disclosure can also be further developed in such a way that the extension is arranged in the corresponding recess via an elastic element under the action of a force at least in one circumferential direction. The advantage of this configuration is that defined by the elasticity of the elastic element, small axial and radial displacements as well as slight tilting between the extension designed, for example, as a pin and the corresponding recess designed, for example, as a cylindrical bore, is made possible. This displacement capacity between the housing of the electric machine and the stator housing is negligible in terms of torque support in the circumferential direction, but it is sufficiently large with regard to all other movements that the stator must perform in order to follow the position of the rotor. Advantageously, the elastic element is designed as an elastomer or as a spiral or leaf spring, as a result of which a simple and space-saving elastic torque support is achieved. This enables relative movements and effectively prevents rattling noises.

The torque support between the stator and the housing can also take place in other ways. It is particularly useful to transmit the torque in the form of a tangential force via an element that is also arranged tangentially or approximately tangentially. This tangentially arranged element should have a slender, elongated shape, with a fastening point adjoining the opposite end regions in the longitudinal direction, with which the element can be fastened to the stator on one side and to the housing of the electric machine on the other side. The torque of the electric machine can then be transmitted in the form of tensile or compressive forces in the longitudinal direction of the element. All other movements of the stator are made possible by elastic deformation of the element. These elastic deformations take place essentially through elastic deflection of the two end regions relative to one another (the elastic deflection takes place mainly orthogonally to the longitudinal direction of the element and through torsion of the element).

For this purpose, the disclosure can be further developed such that the length compensation element is formed from at least one leaf spring connected circumferentially to the stator or from at least one leaf spring assembly connected circumferentially to the stator. Particularly preferably, however, the length-compensating element is formed by a plurality of leaf springs distributed circumferentially connected to the stator or a plurality of leaf spring assemblies distributed circumferentially connected to the stator. High torques can be supported particularly well by means of several length compensation elements distributed around the circumference. The combination of several leaf springs distributed around the circumference allows for significantly less radial displacement of the stator relative to the housing than is the case with a single length compensation element. Therefore, a stator connected via several length compensation elements distributed around the circumference must be aligned very precisely to the axis of rotation of the rotor during assembly. Since the length compensation elements distributed on the circumference want to prevent the stator from later radially wandering away from this position, the length compensation elements distributed on the circumference absorb radial forces of the stator and transfer them to the housing. Therefore, a stator fastened with several leaf springs distributed over the circumference transmits almost no radial supporting force caused by the torque to the rotor via the bearing between the stator and rotor, as is the case with stators that are supported on the housing with only one length compensation element that transmits forces only in the tangential direction. As a result, several length compensation elements distributed around the circumference are well suited to supporting stators of electric machines that generate particularly high torques.

As an alternative to the above embodiment, the torque can also be supported via an inherently rigid tangentially or approximately tangentially arranged element if the two spaced-apart fastening points via which the element is attached on the one side to the stator and on the other side to the housing of the electric machine or another component supporting the stator, allow rotary motions in several spatial directions but at the same time keep the distance between the two attachment points on the stator and on the housing constant. For this purpose, the disclosure can also be implemented in an advantageous manner in that the length compensation element is designed as a coupling rod. In particular, it can be provided that the coupling rod has an articulated connection, in particular a ball joint connection, or an elastic connection, in particular a connection head equipped with an elastomer, on at least one of its free axial ends. Due to a clear functional separation between the elongated, kink-resistant area of the torque support through which the tangential forces of the stator caused by the motor torque are transmitted in the form of tensile or compressive forces between the two attachment points of the length compensation element and the attachment points that can be tilted in all spatial directions, a torque support can be particularly well implemented which is also suitable for high torques, which at the same time allows large axial and radial displacements as well as tilting and wobbling movements of the stator.

A torque support with two attachment points offset on the circumference is arranged in such a way that, viewed in the circumferential direction in which the electric machine transmits the greater torque to the downstream components during operation, the attachment point of the torque support on the stator lies in front of the attachment points of the torque support on the stator-supporting component (e.g., the housing of the electric machine), so that the greatest torque of the electric machine is transmitted in the form of a tangential tensile force on the torque support. In the other circumferential direction, in which the electric machine delivers the lower torque, the torque support then transmits this torque through compressive forces.

According to a further advantageous embodiment of the disclosure, it can also be provided that the length compensation element is designed as a supply line for coolant which extends in the axial direction or in the radial direction and is designed as a corrugated tube. Since the corrugated tube is an elastic component that can transmit forces between two spaced attachment points and at the same time tightly encloses an inner cavity, the corrugated tube can serve as a torque support and as a supply line at the same time. The corrugated tube then transmits the tangential forces caused by the torque of the electric machine from the electric machine stator to the component (e.g., a housing) supporting the electric machine. The axial movements, radial movements and tilting movements of the stator are not significantly influenced by the flexibility of the corrugated tube, since the corrugated tube can deform elastically within the scope of these small spatial displacements and always forms a sealed interior space through which the sensor can be passed.

In a likewise advantageous embodiment of the disclosure, it can be provided that the supply lines are designed to compensate for an axial displacement of the stator that is permitted due to the interposition of the length compensation element between the stator and the component supporting the stator, by a predetermined maximum distance. This means that the stator can align itself with the current position of the rotor but does not rotate, and all connection or supply lines (e.g., cables, busbars, hoses or pipes) that are required for the power supply, control, cooling and monitoring of the stators are designed to be flexible between the stator and the electric motor housing and the stator is connected to the electric motor housing by a torque support element that is also flexible (above also referred to as a length compensation element).

According to a further advantageous embodiment of the disclosure, it can be provided that a supply line designed as a coolant line is formed at least in sections by an elastic and/or displaceable seal, by an elastic corrugated pipe, by an elastic bellows or by an elastic hose, such that a coolant supply to the stator is guaranteed in all axial positions that are made possible by the axial length compensation element between the stator and the component supporting the stator.

Advantageously, the supply line designed as a coolant line comprises a tube section which is designed with an elastic and/or displaceable seal at at least one axial end and is arranged displaceably guided in a receptacle. This creates a particularly stable and long-lasting solution for a supply line for coolant that can be moved in certain areas.

In a likewise advantageous embodiment variant of the disclosure, it can also be provided that the coupling rod for supplying coolant to the stator is hollow on the inside and/or is designed to be electrically conductive at least in regions for the electrical supply of the stator. A functional integration of the torque support function and the task of transferring coolant or electric current in a common assembly that at least partially uses the same components for the two functions can save installation space and/or costs. Since the torque support and the flexible supply lines inevitably take up more space and require more complex components than rigid connecting elements, the functional integration offers the great advantage of compensating for at least part of this disadvantage in terms of space and costs.

It can also be advantageous to further develop the disclosure in such a way that a supply line designed as a power line is designed to be elastic in length at least in sections or is dimensioned in terms of its length and design in such a way that an electrical supply of the stator is ensured in all axial positions, which are made possible by the axial length compensation element between the stator and the component supporting the stator. With regard to the resulting advantages, reference is made to the previous paragraph.

According to a further advantageous embodiment of the subject matter of the disclosure, it can be provided that a supply line designed as a power line has at least in some areas a length compensation section that enables the supply line to be extended, with the length compensation section being formed in particular by a cable, by an elastic busbar, by a spiral conductor or by an elastic, electrically conductive conductor mesh. Because the supply lines allow length compensation and can thus adapt to changing distances between two attachment points, the stator can move within a limited space without damaging the supply lines. The length compensation of the connecting lines makes sense both when the supply line is arranged essentially parallel to the axis of rotation of the electric machine and an axial displacement of the rotor directly causes a change in length of the supply direction, as well as when the supply line is arranged mainly radially and an axial displacement of the stator causes an approximately s-shaped deformation or inclination of the supply line, which also changes the length of the supply line.

Finally, the disclosure can also be advantageously implemented such that the supply lines designed as power lines for the electrical supply of the electric machine are formed by at least two leaf springs or leaf spring assemblies distributed circumferentially on the stator. This creates a structurally particularly interesting solution for contacting the ends of the stator winding. A complex redirection of the stator winding ends to a common central connection point can be omitted and the stator winding ends can be connected circumferentially where they come out circumferentially on the stator at the end of the winding.

Advantageously, the supply line designed as a power line can be formed like a flat strip, the power line being connected to the stator in such a way that the strip plane of the power line extends perpendicularly to the axial direction of movement of the stator. In the case of a flat strip-like shape, the power line has by far its smallest width perpendicular to the strip plane and is therefore most flexible perpendicular to the strip plane. If the strip plane is oriented perpendicular to the axis of rotation of the rotor and thus perpendicular to the axial direction of the stator, the direction in which the power line has the greatest flexibility is oriented in the same direction in which the largest displacements of the stator are to be expected. This orientation and the flat strip-like shape allow power lines to be implemented particularly economically, which have a sufficiently large cross section to transmit the current for the electric machine and at the same time are sufficiently flexible in the axial direction of the electric machine.

The rotor is advantageously mounted on the stator via the first bearing, which is arranged in an annular gap formed in the radial direction between the rotor and the stator, by means of a first bearing point and by means of a second bearing point that is axially spaced from the first bearing point—particularly preferably in such a way that the rotor is supported via a first roller bearing, which is arranged axially fixed between the abutment points formed in the stator and in the rotor, and via a second roller bearing, which is arranged axially fixed between the abutment points formed in the stator and in the rotor. Due to the two axially spaced bearing points, the stator and the rotor are guided and aligned with one another in a particularly precise and tilt-resistant manner. The axial abutment points, which enable both roller bearings to transmit axial forces between the stator and the rotor in at least one direction, also enable the axial fixation of the stator and rotor relative to one another. If each of the two roller bearings can transmit axial forces between the stator and rotor in the opposite direction through the axial abutment, this is a good prerequisite for being able to design the roller bearings as angular contact ball bearings or tapered roller bearings. If these two angular contact ball bearings or tapered roller bearings are arranged in an O arrangement, a particularly tilt-resistant bearing is created between the stator and rotor.

In summary, a bearing concept is proposed which is designed so that first a functional and testable unit can be created from the rotor and the stator mounted on it, which can then be used in a motor vehicle or a unit of a motor vehicle without having to dismantle them again.

The torque support elements can be arranged radially outside of the stator and/or axially next to the stator.

The torque can be supported by an element that can transfer tangential forces between the stator and a component supporting the stator and, due to its flexible connection or its elasticity, behaves resiliently to loads in other spatial directions or to torsion.

This tangentially arranged element can have a slender, elongated shape, at whose opposite end regions in the longitudinal direction there is a respective attachment point, with which the element can be attached on one side to the stator and on the other side to the housing of the electric machine or the electric machine supporting component.

A connecting line that is used for the power supply, control, cooling and/or monitoring of the stator can be designed and connected to the stator and an element supporting the stator in such a way that it can also serve as a torque support for the stator at the same time.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so explanations from other figures can also be used.

In the figures.

DETAILED DESCRIPTION

Figure 1:
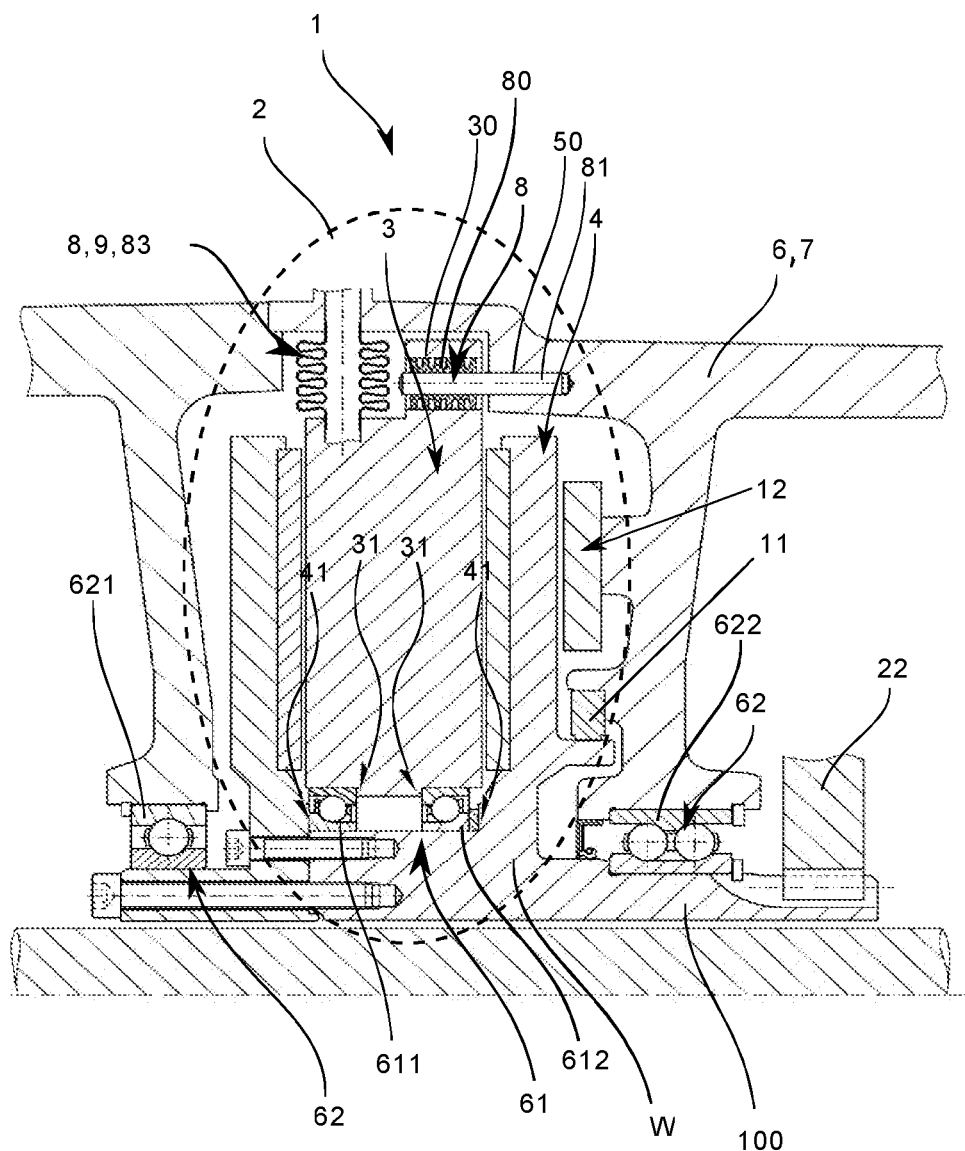
FIG. 1 shows an electric axial flux machine in an H arrangement in an axial section, in a schematic representation.

FIG. 1 shows an electric machine arrangement 1 with an electric machine 2 designed as an axial flux machine in an H arrangement in an axial section, in a schematic representation. The illustration shows an axial flux motor in an H-arrangement, the rotor shaft W of which (designed here as an integral part of the output element 100 designed as a drive shaft) is mounted in a housing 7 which surrounds the electric machine 2. For this purpose, the rotor shaft W is rotatably supported via a bearing 62 with one bearing 621, 622 each in the housing side walls of the housing 7 arranged on the right and left of the electric machine 2. The output element, which is designed in one piece with the rotor shaft W and is in the form of an output shaft, is connected to a gear stage 22 via an external toothing of the output shaft. The stator 3 is arranged between the two disk-shaped rotor halves of the rotor 4 and is supported on the rotor 4 via a further bearing 61 (in the figure consisting of two bearing points 611, 612 designed as angular ball bearings in an O arrangement). Due to this bearing point 61 arranged on the radially inner area of the stator 3 and the torque support preferably arranged on the radially outer area of the stator 3 by a length compensation element 8, the stator 3 is decoupled from the rotary movement of the rotor 4 and thus prevents the stator 3 from twisting or co-rotating impermissibly widely. This torque support supports the reaction torque that always arises when the electric machine 2 generates a torque that is transmitted from the rotor shaft W to a downstream assembly of the drive train. Viewed in the circumferential direction, the stator 3 is virtually firmly connected to the housing 7 via the torque support, as is necessary for the function of the motor. For all other directions of movement, the torque support does not represent a significant restriction, so that the stator 3 can always align itself with the position of the rotor 4 thanks to the bearing 61 between the stator 3 and rotor 4 and can also follow changes in the position of the rotor 4, as can occur for example during driving due to elastic deformation or thermal expansion of the housing 7 and/or the rotor shaft W. In the exemplary embodiment shown in FIG. 1, the torque support or the length compensation element 8 is implemented by an elastic plastic or rubber sleeve, which is introduced into a recess 30 designed as a cylindrical bore in the stator housing and which is placed in the middle on an extension 81 designed as a pin, which is anchored in the housing 7. The hole in the stator housing, the rubber sleeve and the pin anchored in the housing 7 are arranged concentrically to one another and aligned coaxially with the axis of rotation of the electric machine 2. The torque of the electric machine 2 leads to a tangential force on the radial outer area of the stator 3, which is transmitted in the form of a force running radially to the pin of the torque support from the stator housing bore through the rubber sleeve to the pin (and vice versa). Due to the elasticity of the rubber sleeve, slight axial and radial displacements and slight tilting between the pin and the cylindrical bore are possible. This displacement capacity between the housing 7 of the electric machine 2 and the stator 3 or the stator housing is negligible in terms of torque support in the circumferential direction—however, it is sufficiently large with regard to all other movements that the stator 3 must perform in order to follow the position of the rotor 4. In the case of the stator 3 of the exemplary embodiment shown, the coolant is supplied through the supply lines 9 designed as elastic elements (e.g., elastic connecting lines). In FIG. 1, this is realized with the coolant supply indicated by a supply line 9 in the form of a corrugated bellows of the supply line between the housing 7 and the stator 3. This supply line 9 can be implemented, for example, by using a metal corrugated bellows tube or by using a rubber hose (possibly also in the form of a hydraulic hose with fabric reinforcement). In order to avoid undesired currents through the bearing points, a shaft grounding element 11 designed as a shaft grounding ring is arranged between the rotor 4 and the housing 7. This is arranged between an annular flange axially projecting from the housing wall and an annular flange axially projecting from the rotor body. A rotor position sensor 12 is also provided in order to be able to reliably detect the rotary rotor position at any time.

Figure 2:
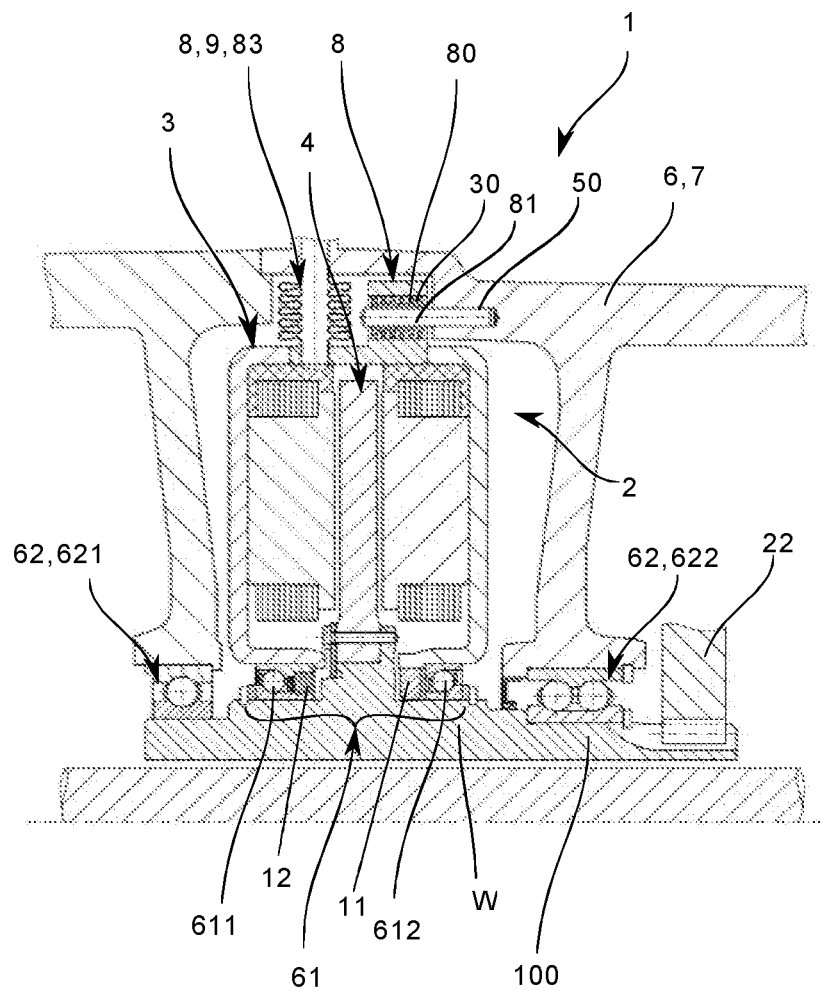
FIG. 2 shows an axial section of an electric axial flux machine in an I arrangement, in a schematic representation.

FIG. 2 shows an axial section, in a schematic representation, of an electric machine 2 designed as an electric axial flux machine in an I arrangement. It is well illustrated here that the functional principle already presented in FIG. 1 can also be transferred to an axial flux motor in an I arrangement. The same components are provided with identical reference symbols in all figures.

Figure 3:
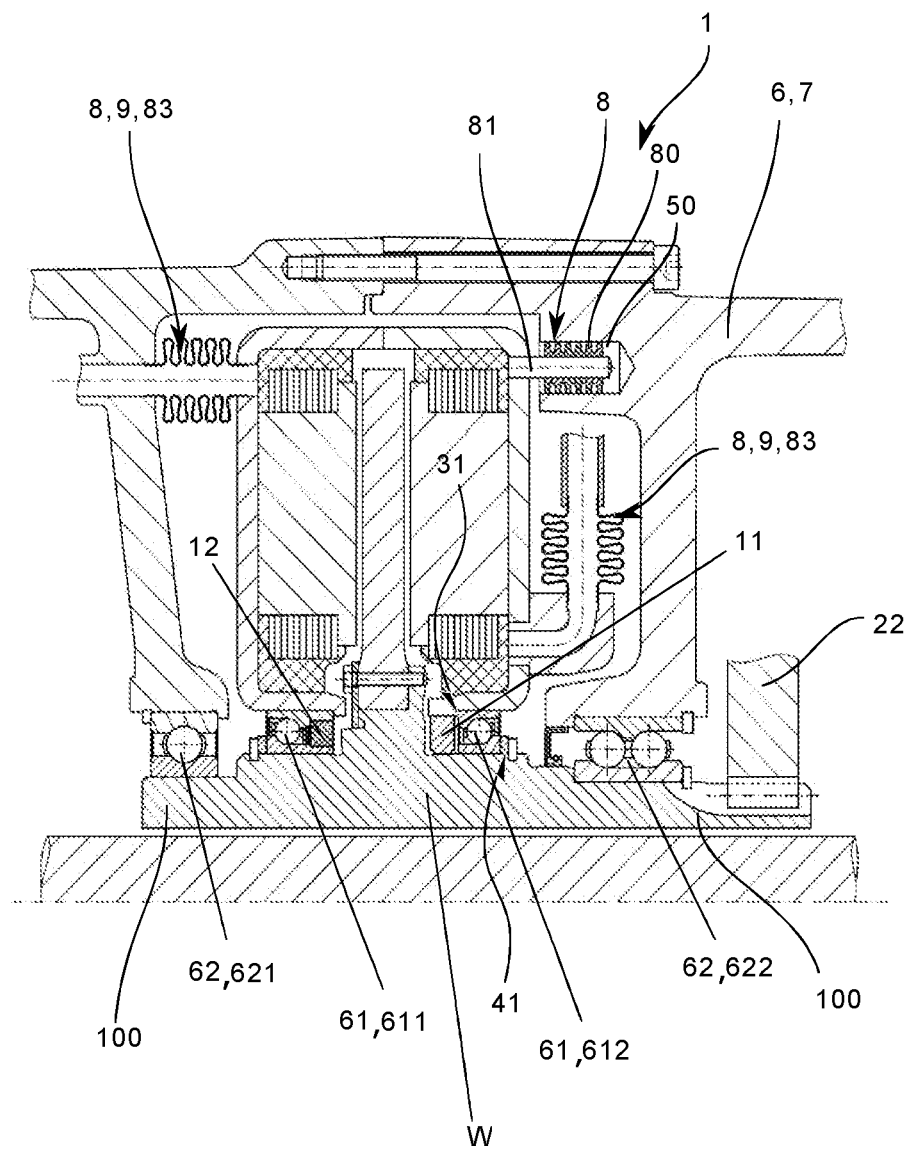
FIG. 3 shows the electric axial flux machine in an I arrangement according to FIG. 2 with a different arrangement of torque-supporting length compensation elements in an axial section, in a schematic representation.

FIG. 3 shows the electric axial flux machine in an I-arrangement according to FIG. 2, wherein the torque support by means of the longitudinal compensation element 8 and/or the supply lines 9 do not necessarily have to be arranged radially above the stator 3. These elements can also be arranged completely or partially axially next to the electric machine 2. This can be implemented particularly well in the case of axial flux motors in an I arrangement, since the two stator halves of the stator 3 which surround the rotor 4 form the axially outer components of the electric machine 2. In FIG. 3, the torque support is again realized by the rubber sleeve already known from FIG. 1. In this case, however, this is arranged axially next to the stator 3. In the exemplary embodiment, the torque support is arranged relatively far radially outwards, despite the arrangement next to the stator 3, in order to reduce the forces introduced into the torque support by the motor torque. The position shown here for the torque support is also very well suited for the alternative embodiments of the torque support described above. FIG. 3 shows a supply line 9 designed as a coolant supply line, which is connected radially on the inside to the right-hand end face of the stator. This supply line 9 is connected to the stator 3 via an angle piece, which is adjoined by an elastic area which runs in the radial direction and which merges into a tube. Connecting the connecting elements (e.g., cables, conductor rails, pipes or hoses) to the stator 3 as far inside as possible is particularly useful, since the displacements caused by the tilting movements of the stator 3 are smaller there than radially outwards and thus the resulting elastic deformations of the connecting elements can be reduced.

A further supply line is arranged in the axial direction on the left end face of the stator 3. Any number of electric and hydraulic lines can also be arranged on this side in different radial positions and in different orientations.

Figure 4:
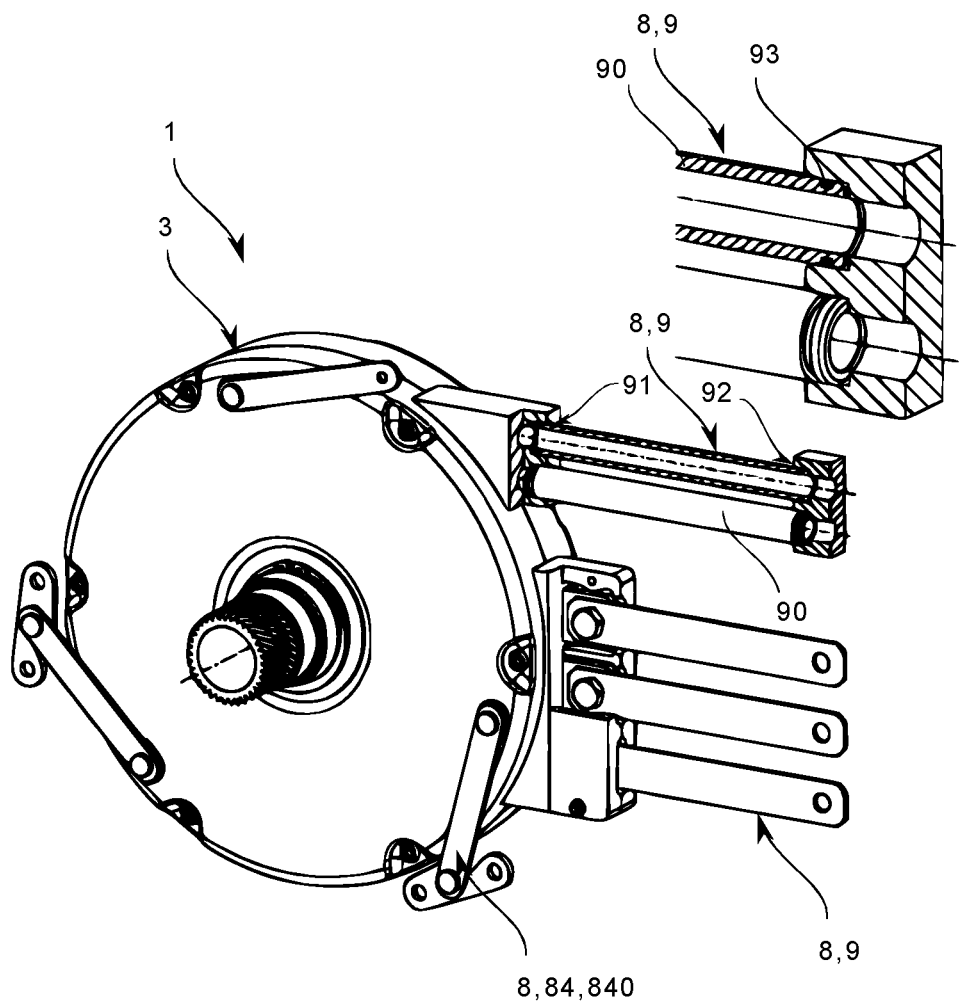
FIG. 4 shows an electric axial flux machine in an I arrangement with a torque support via leaf springs, a power supply via electric busbars and a coolant supply via movably mounted conduits in a perspective representation.
Figure 5:
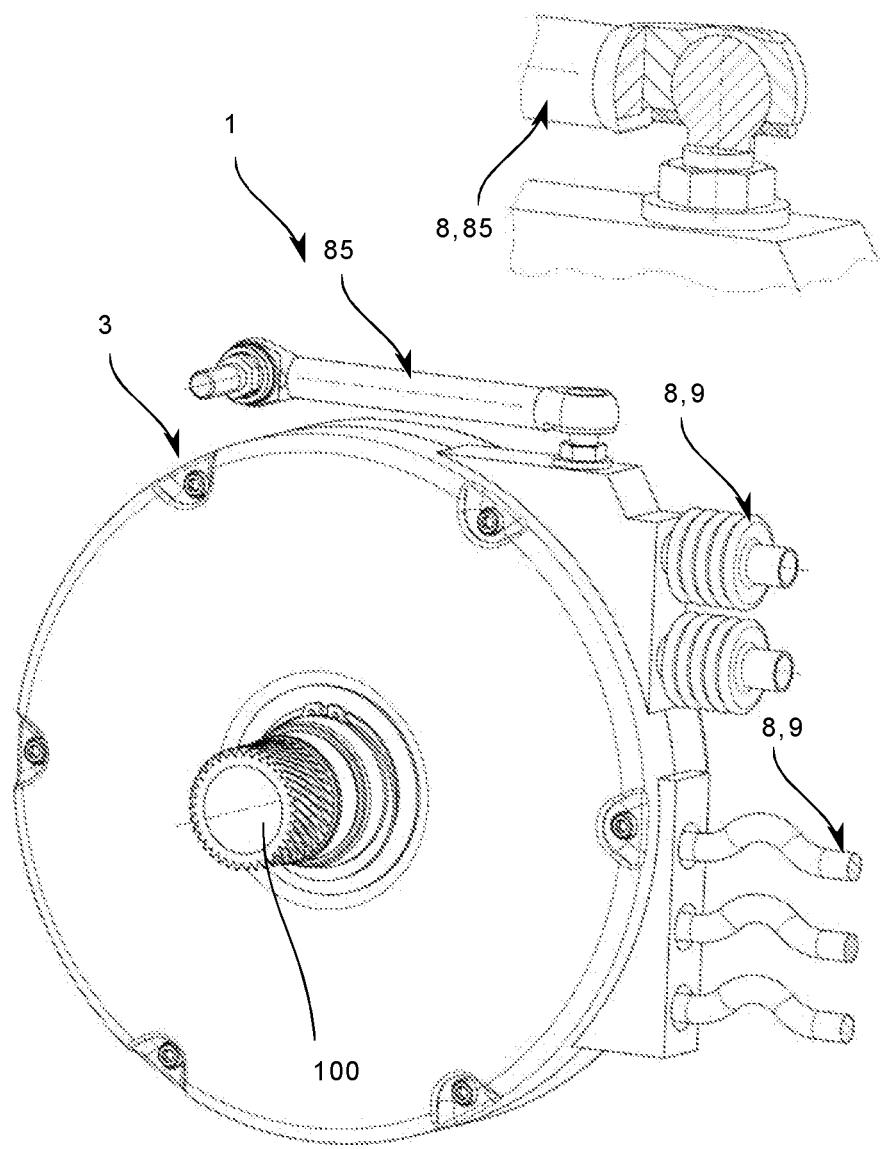
FIG. 5 shows an electric axial flux machine in an I arrangement with a torque support via a rigid coupling rod arranged approximately tangentially.
Figure 6:
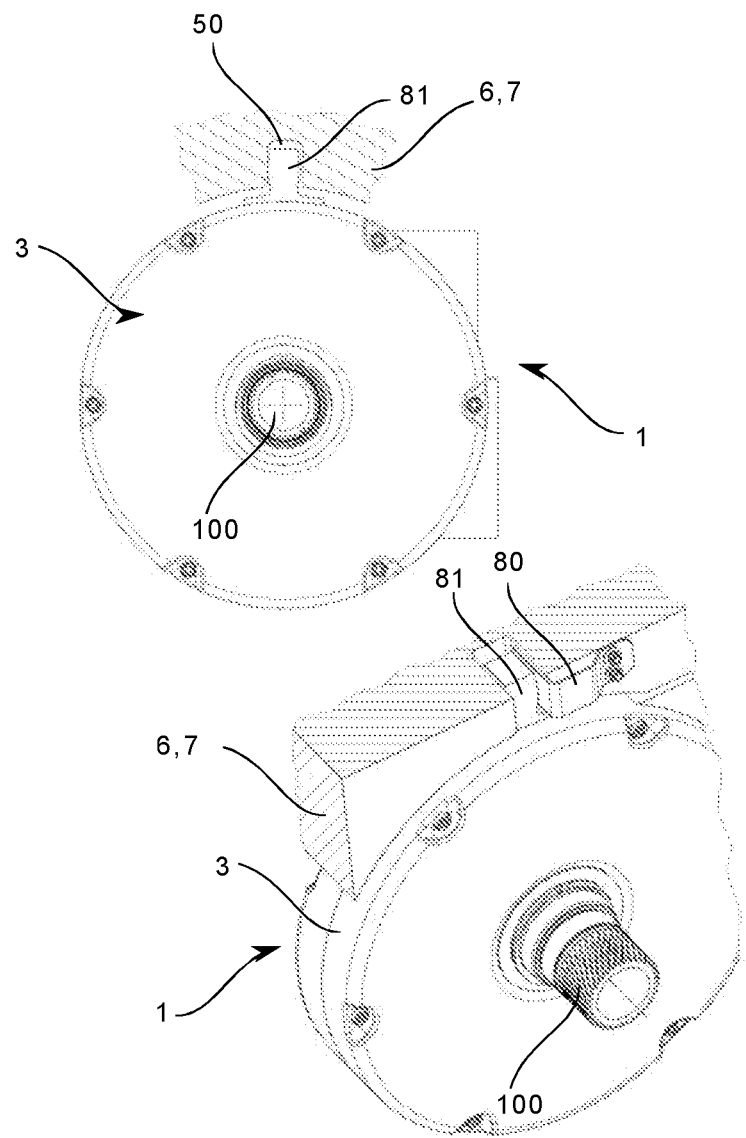
FIG. 6 shows an electric axial flux machine with a structurally simple torque support via a pin mounted in a recess, in a schematic representation, once in an axial top view (top) and once in a perspective view (below), with the lower representation of the pin being designed as a leaf spring elastic element is subjected to a force in the circumferential direction.

Only the housed stator 3 of the axial flux machine is shown in the I-arrangement in FIGS. 4-6, the rotor 4 being covered by the stator halves which are connected to one another radially on the outside and housed in the stator housing.

FIG. 4 shows an electric machine 2 designed as an electric axial flux machine in an I arrangement with a length compensation element 8 designed as a torque support via leaf springs 84, a power supply via electric busbars and a coolant supply via movably mounted pipe sections 90 in a perspective view. The length compensation element 8 is formed from a total of three leaf springs 84 or leaf spring assemblies 840 connected circumferentially to at least one axial end face of the stator 3.

In the illustrated embodiment, a total of three approximately tangentially aligned leaf spring assemblies 840 distributed on the circumference are shown. The leaf spring assemblies 840 consist of several leaf springs 84 lying one above the other and fixed to the neighboring components with the same fasteners (rivets). The leaf springs 84 are made from thin spring steel sheet and are mounted in such a way that their sheet metal planes are aligned (approximately) orthogonally to the axis of rotation of the electric machine 2 (axial direction). One end of each of the leaf spring assemblies 840 is attached to the stator 3 of the electric machine 2 and the other end to an element supporting the electric machine 2 (e.g., a housing 7—not shown in the figure). If the stator 3 is displaced axially, the leaf spring assemblies 840, which are axially soft due to their structure, can participate in the displacement and at the same time support the electric machine 2 in the circumferential direction, so that the motor torque can be transmitted through the leaf springs 84 to the element supporting the electric machine 2. The three leaf spring assemblies 840 arranged on the circumference also have a radially centering effect on the stator 3. Therefore, the electric machine 2 must be mounted with its axis of rotation exactly coaxial to the axis of rotation of the output element 100—for example, the transmission input shaft (or the differently configured downstream unit). This can be done by making the mounting holes, with which the leaf spring 84 is screwed to the housing 7 or to the stator 3, slightly larger than the screws, so that there is enough play to be able to align the electric machine 2 exactly during assembly. Alternatively, the electric machine 2 can also be precisely aligned with its neighboring unit via pinned centering holes. For this purpose, centering holes must then be drilled on the housing 7 precisely aligned with the axis of rotation of the neighboring unit (transmission), and centering holes must be drilled on the leaf springs 84 precisely aligned with the axis of rotation of the rotor 4, which are then pinned together. If the leaf springs 84 are part of the transmission housing in terms of assembly, the precisely drilled centering holes must of course be introduced into the stator 3 and the leaf spring assemblies 840. Fastening elements are shown in the lower and left part of the illustration, which are riveted to the leaf springs 84 and have fastening holes or in which the centering holes can be drilled, via which the leaf spring assemblies 840 are then screwed to the housing 7. Alternatively, this exemplary embodiment can also be equipped with only one leaf spring assembly 84. A single leaf spring assembly 840 cannot radially center the electric machine 2 and therefore does not require such precise alignment during assembly. The centering of the stator 3 then only takes place via the bearing of the stator 3 on the rotor 4 or the rotor shaft W.

FIG. 5 shows an electric machine 2 designed as an electric axial flux machine in an I-arrangement with a torque support via a length compensation element 8 by means of an approximately tangentially arranged, rigid coupling rod 85. The coupling rod 85 shown is connected to the stator 3 and a component supporting the stator 3 via fastening points at both axial ends. As can be seen in the enlarged detailed illustration above, these attachment points are each designed as ball heads that allow rotary motions in several spatial directions. As a result, the torque support can prevent the stator 3 from also rotating unintentionally and at the same time adapt to radial and axial displacements of the stator 3 without impeding these movements.

In the exemplary embodiment shown in FIG. 5, the cooling liquid (or a fluid that fulfills a different task) is supplied and discharged through two supply lines 9 designed as elastic corrugated bellows tubes. These corrugated bellows tubes can be made of metal or plastic, for example. Alternatively, the fluid can also be supplied via hoses, for example via hoses with fabric reinforcement, as is the case with hydraulic hoses, for example. Several elastic elements can also be arranged one behind the other. For example, it makes sense to arrange a rigid connecting element such as a piece of pipe between two elastic elements, via which it is then connected to the stator 3 and to the component providing the fluid. Due to the rigid element between the two elastic elements, most movements of the stator 3 result in only small angular movements in the elastic elements. This reduces the deformation of the elastic elements, so that smaller and cheaper elastic elements can be used.

In order to supply the electric machine 2 with electricity, three electric supply lines 9 designed as bent electric conductors are provided in the exemplary embodiment in FIG. 5. The conductors connect the stator 3 to a component providing the electric current (not shown in the figure). Due to the arching of the bent conductors, the conductors become more flexible and can elastically compensate for movements of the stator 3 relative to the adjacent component in all spatial directions. The longer the conductor and the more it is arched or curved, the more flexible it becomes. Conductors bent in a spiral shape or conductors bent in a meandering shape are particularly well suited for accommodating a sufficiently elastic conductor in a small installation space. The conductors can be solid (e.g., in the form of a straight or curved rod) or they can be composed of thinner wires, such as is the case with cables or metal mesh.

FIG. 6 shows an electric machine 2 designed as an electric axial flux machine with a structurally simple torque support via a journal mounted in a recess, in a schematic representation, once in an axial top view (top) and once in a perspective view (below), wherein in the lower representation, the pin is acted upon by a force designed as a leaf spring elastic element in the circumferential direction. The torque is supported here via a stop acting in the circumferential direction or a form fit between the stator 3 of the electric machine 2 and the housing 7 (or another element supporting the electric machine 2). In the exemplary embodiment, an extension 81 connected to the stator 3 protrudes into a slot in the housing 7. Depending on the direction in which the electric machine 2 exerts torque on the wheels, one side or the other of the extension lies tangentially against the corresponding contact surface of the slot in the housing 7. If the torque direction changes, the stator 3 rotates minimally until the tangential play is overcome and the previously unloaded stop surfaces of the stator 3 and housing 7 come into contact and can thus transmit the tangential force caused by the torque. Radial and axial movements of the stator 3 are still possible since the extension 81 can be displaced radially and axially in the slot. With this design of the torque support, it makes particular sense to position it radially as far outside as possible on the stator 3 of the electric machine 2 in order to create the greatest possible distance between the axis of rotation of the electric machine 2 and the contact point of the torque support. Due to this large distance between the axis of rotation of the electric machine 2 and the contact point of the torque support, the tangential support force is reduced and thus also the sliding friction that occurs during axial or radial displacements of the stator 3 when torque is transmitted at the same time. In order to further reduce the friction that occurs or to reduce wear at the contact points, the contact points can also be coated or additional components made of friction-reducing and/or wear-resistant material can be arranged between the extension of the electric machine 2 and the housing 7.

Alternatively, other contours forming a tangential form fit can also be used as torque support. For example, the housing 7 can also have an extension which protrudes into the stator 3 instead of the stator 3 protruding into the housing 7 with an extension 81.

Alternatively, the torque support subject to play can also be provided with a spring mechanism that exerts a tangential force on the stator 3, the electric machine 2 and/or the torque support (illustration below). Due to the tangential spring force, the spring exerts a torque on the stator 3, which torque is superimposed on the torque with which the stator 3 must be supported on the torque support in order to drive the rotor shaft W. The flank change, which occurs in the torque support with play when the torque crosses zero, can be shifted to other engine torques by the spring mechanism. With the correct dimensioning of the spring mechanism, the flank change can thus be placed in an engine torque range in which the flank change is not disruptive. For example, it is possible to place the flank change in a torque range that is rarely passed through in order to reduce the number of edge changes. As a result, the wear on the torque support can be reduced. For example, it is also possible to place the flank change in a torque range in which possible rattling noises from the torque support do not interfere, since they are masked by other driving noises. If the spring mechanism is strong enough, the motor can also be pressed so hard in one direction against a contact surface (flank) of the torque arm that the motor torque in the opposite direction is never, or almost never, large enough to overcome the force of the spring mechanism and a flank change in the torque support.

The spring mechanism shown consists of a curved leaf spring which is fixed to the housing 7 and whose free resilient end lies between the extension 81 and the adjacent contact surface of the housing gap. The free end of the spring can thus exert a tangentially acting force on the extension 81 of the stator 3, which presses it against the opposite contact surface of the housing gap. Since the spring is arranged between the extension 81 and one of the two contact surfaces of the housing 7, it also protects the contact surface of the housing 7 behind the spring from wear. This effect can also be used for the opposite contact point between the extension 81 and slot by mounting a high-strength or hardened sheet metal part between the extension 81 and slot there as well. It is even possible to use an identical spring for this if it is installed in such a way that it does not exert any force in the direction of the extension 81 or is significantly weaker than the opposite spring.

Figure 7:
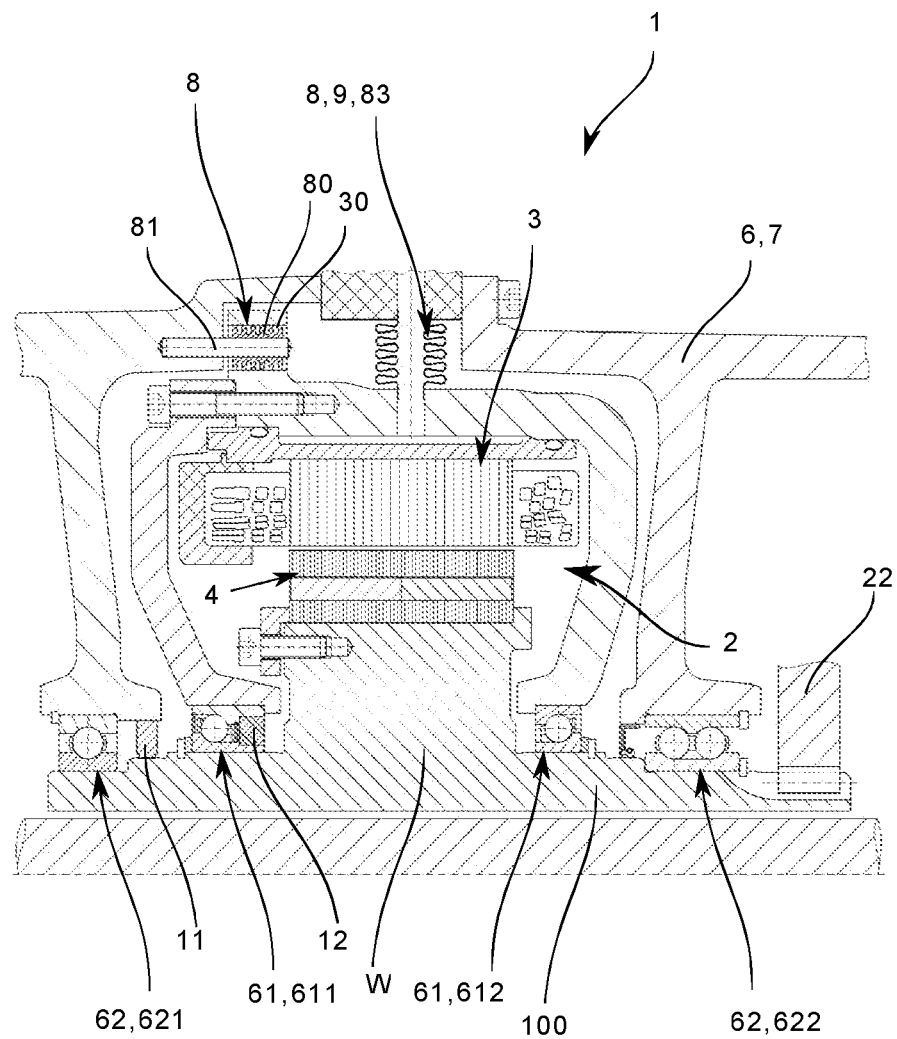
FIG. 7 shows an electric radial flux machine in an axial section, in a schematic representation—and thus that the solutions presented using the example of various axial flux machines can also be transferred to radial flux machines.

FIG. 7 shows an axial section of an electric machine 2 designed as an electric radial flux machine, in a schematic representation—thus illustrating that the solutions presented using the example of various axial flux machines can also be transferred to radial flux machines. FIG. 7 shows a radial flux machine which is supported with its stator housing via corresponding length compensation elements 8 for torque support of the stator 3 against the housing 7 of the electric machine 2. The rotor 4 is supported on the stator via the bearing point 61 and the rotor 4 is supported with its rotor shaft W on opposite sides of the housing 7 in housing walls. Otherwise, the properties described above with regard to axial flux machines also apply analogously to the radial flux machine shown—or they can be implemented accordingly.

The axially elastic elements (length compensation elements 8) shown in the exemplary embodiments, which serve to support the torque or are part of the flexible lines between the stator 3 and the components surrounding the stator 3, are always only shown as examples of elements with these properties. In all of the exemplary embodiments, differently designed elements can always be used if they have comparable properties to the detailed solutions shown.

The mounting of the stator 3 on the rotor 4 or the rotor shaft W presented here is particularly useful for axial flux motors, since these electric motors are particularly sensitive to axial forces acting on them or long tolerance chains that affect the air gaps due to their slim, disc-shaped design between rotor and stator. However, the mounting of the stator 3 on the rotor 4 is also useful for all other electric motors in order to reduce the axial force load on the structure of the electric motors and to be able to ensure a very precise alignment between the stator 3 and the rotor 4 over the long term.

The bearing variants described here are not only applicable to e-axles. The bearing variants can also be used for electric motors that are arranged at other points in a motor vehicle. The bearing can also be used independently of the type of units driven by the electric motors. A spur gear stage 22 is always shown in the illustrations, which is intended to indicate a transmission that absorbs the torque of the electric machine 2. However, other aggregates or drive train components can also be driven. For example, it is also possible for the electric motor to be connected directly to a drive wheel.

In the context of this application, the drive train is understood to mean all components of a motor vehicle that generate the power for driving the motor vehicle and transmit it to the road via the vehicle wheels.

The terms "radial", "axial", "tangential" and "circumferential direction" used in this disclosure always refer to the axis of rotation of the electric machine. The terms "left", "right" and "above", "below" are used here only to clarify which areas of the illustrations are currently being described in the text. The later embodiment of the disclosure can also be arranged differently.

The disclosure is not limited to the embodiments shown in the figures. The above description is therefore not to be regarded as restrictive, but rather as explanatory. The following claims are to be understood as meaning that a named feature is present in at least one embodiment of the disclosure. This does not exclude the presence of further features. If the patent claims and the above description define "first" and "second" features, this designation serves to distinguish between two features of the same type without defining an order of precedence.

LIST OF REFERENCE SYMBOLS 1 machine arrangement
2 electric machine
3 stator
4 rotor 6 (the stator-) supporting component
7 housing
8 length compensation element
9 supply line
11 shaft grounding element
12 rotor position sensor
22 gear wheel/gear stage
30 recess (stator)
50 recess (housing)
31 abutment (stator)
41 abutment (rotor)
61 bearing (rotor/stator) 611 first bearing point 612 second bearing point
62 bearing (rotor shaft/housing) 621 first bearing point 622 second bearing point
80 elastic element
81 extension
83 corrugated pipe
84 leaf spring
840 leaf spring assembly
85 coupling rod
90 pipe section
91, 92 receptacle (for pipe section)
100 output element

The invention claimed is:

1. An electric machine arrangement, comprising:
an electric machine for driving an electrically drivable motor vehicle, having a stator and a rotor,
a component supporting the stator, and
an output element in contact with the rotor for conjoint rotation therewith,
wherein:
the stator is arranged supported relative to the rotor via at least a first bearing in such a way as to be decoupled from a rotary motion of the rotor, wherein the stator is supported with an interposition of a length compensation element in a direction of rotation and is connected to the component supporting the stator at least in an axially movable manner, wherein the length compensation element comprises a coupling rod, wherein the coupling rod is configured for supplying coolant to the stator and is hollow on an inside or is electrically conductive at least in regions for an electrical supply of the stator.

2. The electric machine arrangement according to claim 1, wherein:
the component supporting the stator is a housing of the electric machine.

3. The electric machine arrangement according to claim 1, wherein:
the rotor is mounted on the component supporting the stator via a second bearing by at least one first bearing point.

4. The electric machine arrangement according to claim 1, comprising an additional length compensation element, wherein:
the additional length compensation element comprises an extension that extends in an axial direction or in a radial direction, which is guided in some areas in a corresponding recess, the extension being connected either to the stator or to the component supporting the stator, and the corresponding recess is formed in the component supporting the stator or in the stator.

5. The electric machine arrangement according to claim 4, wherein:
the extension is arranged in the corresponding recess via an elastic element under action of a force at least in one circumferential direction.

6. The electric machine arrangement according to claim 5, wherein:
the elastic element comprises an elastomer, a spiral spring, or a leaf spring.

7. The electric machine arrangement according to claim 1, comprising an additional length compensation element, wherein:
the additional length compensation element comprises at least one leaf spring connected circumferentially to the stator or from at least one leaf spring assembly connected circumferentially to the stator.

8. The electric machine arrangement according to claim 7, wherein:
the additional length compensation element is formed by a plurality of leaf springs distributed circumferentially connected to the stator or a plurality of leaf spring assemblies distributed circumferentially connected to the stator.

9. The electric machine arrangement according to claim 1, wherein:
the coupling rod has a ball joint connection or a connection head equipped with an elastomer on at least one of its free axial ends.

10. An electric machine arrangement, comprising:
an electric machine having a stator and a rotor, wherein the stator is arranged to be supported relative to the rotor via at least a first bearing in such a way as to be decoupled from a rotary motion of the rotor;
a component supporting the stator;
an output element in contact with the rotor for conjoint rotation therewith; and
a length compensation element, wherein the length compensation element comprises a supply line for coolant which extends in an axial direction or in a radial direction, wherein the supply line compensates for an axial displacement of the stator that is permitted due to an interposition of the length compensation element between the stator and the component supporting the stator, by a predetermined maximum distance.

11. The electric machine arrangement according to claim 10, wherein:
the supply line is formed at least in sections by an elastic or displaceable seal, by an elastic corrugated pipe, by an elastic bellows or by an elastic hose, such that a coolant supply to the stator is guaranteed in all axial positions that are made possible by the length compensation element between the stator and the component supporting the stator.

12. The electric machine arrangement according to claim 11, wherein:
the supply line comprises a tube section which comprises the elastic or displaceable seal at at least one axial end and is arranged displaceably guided in a receptacle.

13. The electric machine arrangement according to claim 10, wherein:
the supply line is elastic in length at least in sections or is dimensioned in terms of its length and design in such a way that an electrical supply of the stator is ensured in all axial positions, which are made possible by the length compensation element between the stator and the component supporting the stator.

14. The electric machine arrangement according to claim 10, wherein:

the supply line has at least in some areas a length compensation section that enables the supply line to be extended, the length compensation section being formed by a cable, by an elastic busbar, by a spiral conductor or by an elastic, electrically conductive conductor mesh.

15. The electric machine arrangement according to claim 10, wherein:
the supply line is formed by at least two leaf springs or leaf spring assemblies distributed circumferentially on the stator.

16. The electric machine arrangement according to claim 10, wherein:
the supply line is formed like a flat strip, the supply line being connected to the stator in such a way that a strip plane of the supply line extends perpendicularly to an axial direction of movement of the stator.

* * * * *